United States Patent [19]

Logsdon

[11] 3,939,868
[45] Feb. 24, 1976

[54] ADJUSTABLE AIR VOLUME REGULATOR FOR AIR-CONDITIONING SYSTEMS

[75] Inventor: Hillard Glenn Logsdon, Charlotte, N.C.

[73] Assignee: Aeronca, Inc., Pineville, N.C.

[22] Filed: Mar. 8, 1974

[21] Appl. No.: 449,441

[52] U.S. Cl. ............. 137/517; 137/512.15; 236/49; 138/46; 251/337
[51] Int. Cl.² ..................... F16K 15/14; F16K 17/30
[58] Field of Search ............ 251/337; 137/517, 522, 137/523, 512.15, 521, 518, 524; 267/135, 175, 177; 138/46; 236/49

[56] References Cited
UNITED STATES PATENTS

| 2,638,925 | 5/1953 | Monahan | 251/337 X |
|---|---|---|---|
| 2,890,716 | 6/1959 | Werder | 137/517 X |
| 2,906,287 | 9/1959 | Kreuttner | 137/489 |
| 3,037,528 | 6/1962 | Baars et al. | 138/46 |
| 3,084,711 | 4/1963 | Phillips et al. | 138/46 |
| 3,155,109 | 11/1964 | Anthon | 267/177 X |
| 3,255,963 | 6/1966 | Gorchev et al. | 138/46 X |
| 3,371,303 | 2/1968 | Fay | 267/175 X |
| 3,394,769 | 7/1968 | Smith et al. | 137/517 X |
| 3,425,443 | 2/1969 | Smith | 137/512.15 |
| 3,433,410 | 3/1969 | Warren, Jr. | 236/92 R X |

Primary Examiner—William R. Cline
Attorney, Agent, or Firm—Parrott, Bell, Seltzer, Park & Gibson

[57] ABSTRACT

An air volume regulator adapted for use in an air distribution system for maintaining a constant flow of air therethrough regardless of variations in pressure of the air being supplied to the regulator is provided with adjustment means to permit adjusting the regulator for maintaining constant flow at a variety of different flow rates. The regulator includes a housing defining a passageway for the flow of air therethrough, valve means movable within the housing for adjustably restricting the flow of air therethrough, and a coil compression spring cooperating with the valve means for exerting an opening bias thereon in opposition to a closing bias imparted on the valve means by the pressure of the air in the housing. Adjustment means is provided cooperating with the coil spring for immobilizing a selected number of the turns of the coil spring so as to vary the biasing characteristics of the spring and thereby adjust the regulator for maintaining a different flow rate.

9 Claims, 8 Drawing Figures

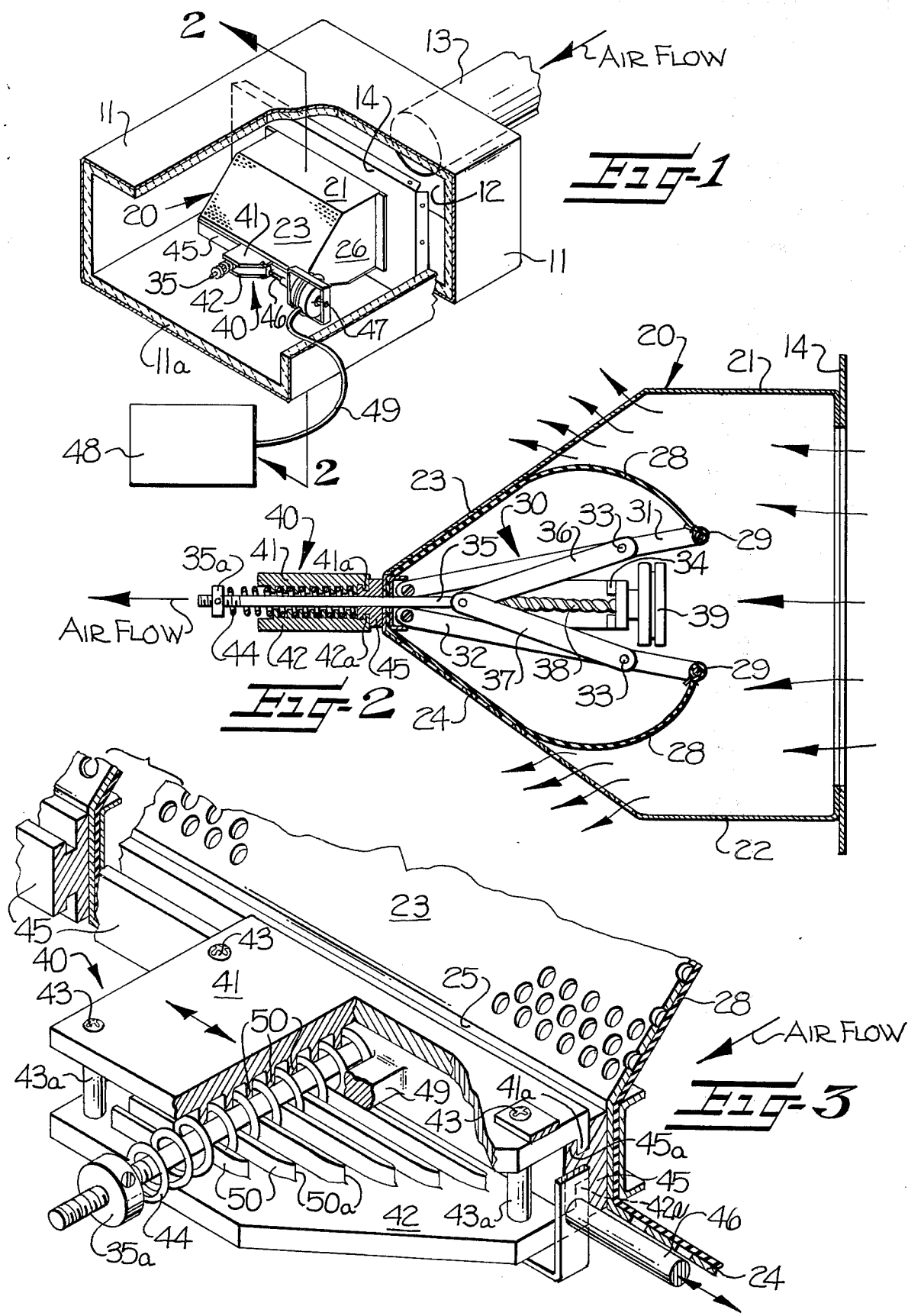

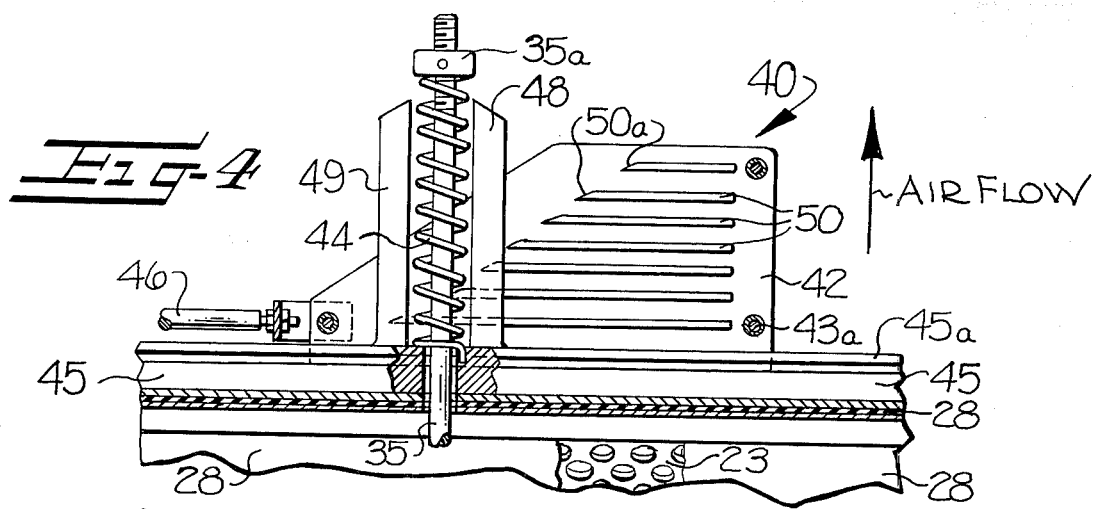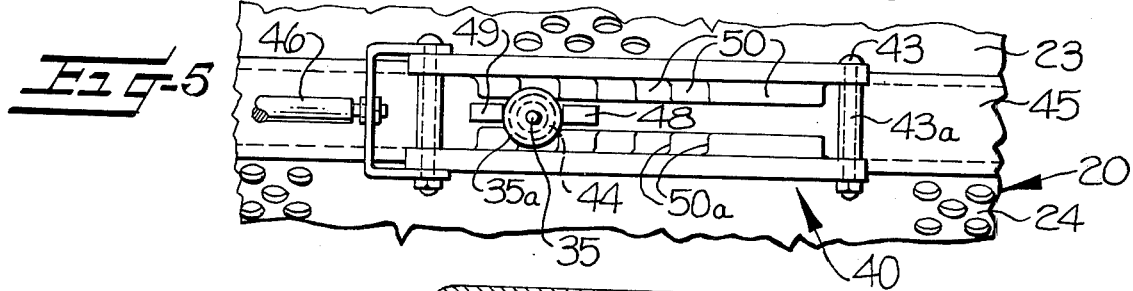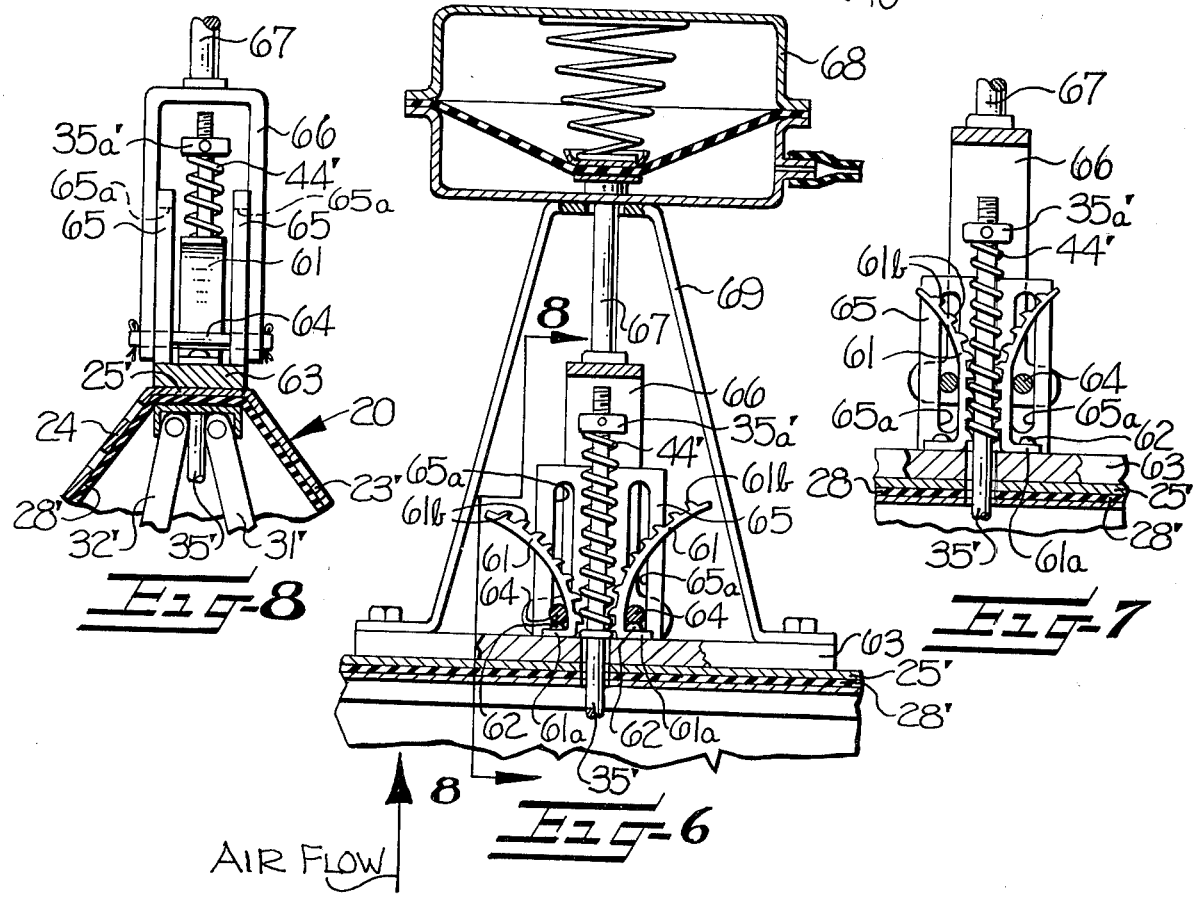

ADJUSTABLE AIR VOLUME REGULATOR FOR AIR-CONDITIONING SYSTEMS

This invention relates to air-conditioning systems and more particularly to an air volume regulator adapted for maintaining a substantially constant volume flow of air therethrough.

In air-conditioning systems where air is supplied from a central conditioning device to a plurality of individual distribuing units or terminals, changing demands for air in the rooms or zones being conditioned will cause pressure variations in the air delivery lines with resultant variations in the volume of air flowing therethrough. Accordingly, the individual air distributing units are conventionally provided with air volume regulators adapted for maintaining a substantially constant volume flow of air therethrough regardless of variations in pressure in the air delivery lines leading thereto.

Air volume regulators conventionally employed in such systems include a valve member mounted in the path of air flow and adapted for movement in response to variations in air supply pressure for thereby adjustably restricting the size of the air passageway through the regulator, and a spring cooperating with the valve member for exerting an opening bias on the valve member in opposition to a closing bias exerted thereon by the pressure of the air flow in the housing. Thus, an increase in pressure of the air being supplied to the regulator causes the valve to provide a greater restriction to the air flow therethrough, while a decrease in pressure permits the valve to open more fully to thereby maintain the flow of air through the regulator at a substantially constant rate. One regulator of this type is disclosed in Werder U.S. Pat. No. 2,890,716, issued June 16, 1959, which employs a flexible curtain type of valve member and a coil compression spring cooperating with the flexible curtain valve member for biasing the same open against the flow of air.

Conventional air volume regulators such as the type described in the above patent are adapted for being manually adjusted for maintaining a different flow rate by varying the pre-tension exerted on the coil compression spring. However, this type of adjustment is effective only over a relatively narrow range of flow rate. When adjustment of the regulator to a substantially different flow rate is desired, it is necessary to replace the coil compression spring with one of different biasing characteristics. Since volume regulators are generally mounted within a duct or housing and are therefore not readily accessible, manual adjustment of the spring pre-tension or replacement of the spring is a difficult and time consuming operation. Further, since a variety of different coil springs are required for several various ranges of flow rates, it is necessary to maintain an inventory of the springs to permit ready adjustment of the regulators in an air-conditioning system.

Air volume regulators have also been provided which are adapted for being adjusted automatically to a different flow rate. Regulators of this type have particular applicability in variable volume air-conditioning systems where the volume of the air being supplied to a room or zone is varied in response to changing demand for conditioned air in the room or zone. The prior adjustable air volume regulators have had several shortcomings, including the inability to accurately maintain constant volume flow at all flow rate settings, a narrow range over which the regulator is adjustable, and the inability to completely shut off the air flow when this is desired.

One such adjustable regulator is disclosed in Warren Jr. U.S. Pat. No. 3,433,410, issued Mar. 18, 1969. This regulator employs a pair of side-by-side coil spring biased valve means, each being adapted for maintaining a predetermined constant flow of air therethrough With the total air flow from the two valves corresponding to the desired maximum flow of air from the regulator. Means are provided for overriding the biasing spring of one of the two valve means to thereby force this valve into a closed position when a minimum flow of air is required, and for partially closing the valve when an intermediate flow of air is required. When this valve is maintained in a partially closed position by the overriding means, so as to thereby provide an intermediate flow of air through the regulator, the valve is unable to move in response to variations in pressure of the supply air and therefore does not maintain uniform flow therethrough. Thus, this type of regulator is not able to accurately maintain a constant volume flow of air at intermediate settings between the desired maximum and minimum rates since at such settings the biasing spring of one of the valves is not operative. Additionally, this regulator is not adapted for completely shutting off the air flow. Further, this type of adjustable regulator has a fairly narrow operating range of flow rates through which it may be automatically adjusted, and relies upon manual adjustment of spring pre-tension or manual spring replacement for adjusting the regulator to a different operating range.

With the foregoing in mind, it is an object of this invention to provide an air volume regulator for air-conditioning systems which is easily adjustable for accurately maintaining a constant volume flow of air over a wide range of flow rates.

It is another object of this invention to provide an adjustable volume regulator of the type described which is adapted for being mounted in an air distribution duct and which may be easily adjusted over a wide range for maintaining a different flow rate without requiring access to the regulator or replacement of the biasing spring component thereof.

It is another object of this invention to provide an adjustable volume regulator of the type described wherein a reciprocable movement of short stroke and relatively low force will operate the spring adjustment mechanism over its entire range of adjustment.

It is a further object of this invention to provide an adjustable air volume regulator of the type described which is suitable for use in a variable volume air-conditioning system and which includes means responsive to a demand for an increase or decrease in the quantity of air being supplied to an air-conditioned room or zone for automatically adjusting the regulator to maintain a different flow rate.

In accomplishing the above objects of this invention, means are provided cooperating with the coil compression spring of the regulator for changing the biasing characteristics thereof to thereby obtain, in essence, a variety of different coil springs for controlling the air flow in the regulator. Thus, the need for manual spring replacement is eliminated.

Since the biasing characteristics of the coil spring may be varied as required, the regulators of this invention are able to maintain constant flow much more accurately at each control point or setting than the prior regulators and it is not necessary to alter or to compensate the biasing force of the spring by adjusting the pre-tension on the same. Regulators in accordance with the present invention easily maintain constant flow within an accuracy of ± 5% at a given flow setting, and often have demonstrated an ability to maintain constant flow within an accuracy as great as ± 0.5%.

In accordance with this invention, the biasing characteristics of the coil compression spring are varied by immobilizing a selected number of the turns of the spring so as to vary the effective length of the spring. This is accomplished by providing means defining a plurality of spaced abutment shoulders alongside of said coil spring, and means cooperating with the plurality of abutment shoulders for successively positioning a desired number of the abutment shoulders between the turns of the spring More particularly, the plurality of abutment shoulders are preferably in the form of two opposing series of spaced abutment shoulders positioned on opposite sides of the coil compression spring and adapted for movement into the spring from opposite sides thereof. The abutment shoulders in each series are preferably spaced apart a distance corresponding to the spacing of the turns of the coil spring in its unbiased condition to thereby facilitate movement of the abutment shoulders into the spring. The abutment shoulders in each series are adapted for being successively positioned between adjacent turns of the spring to thereby facilitate progressively moving the valve means toward an open position due to the insertion of an increasing number of the abutment shoulders into the spring. Thus, a relatively low force is required in adjusting the spring, and the spring may thereby be easily adjusted manually or by use of a relatively low powered and inexpensive prime mover. Further, the abutment shoulders are arranged so that a relatively small amount of movement is required for adjusting the spring whereby a conventional reciprocable operator, such as a pneumatic or electric motor may be employed.

Some of the objects and advantages of the invention having been stated, others will appear as the description proceeds when taken in connection with the accompanying drawings, in which:

FIG. 1 is a perspective view, with parts broken away, of a portion of an air distribution unit employing an adjustable air volume regulator in accordance with a first embodiment of the invention;

FIG. 2 is a vertical sectional view of the air volume regulator taken substantially along line 2—2 of FIG. 1;

FIG. 3 is an enlarged detailed perspective view, with parts broken away, showing the spring adjustment mechanism of the adjustable air volume regulator of FIG. 1;

FIG. 4 is a sectional view of the spring adjustment mechanism illustrated in FIG. 3;

FIG. 5 is an elevational view of the spring adjustment mechanism;

FIG. 6 is a sectional view of a spring adjustment mechanism in accordance with a second embodiment of the invention;

FIG. 7 is a fragmentary detailed sectional view of the spring adjustment mechanism of FIG. 6, but shown in a different position of adjustment; and FIG. 8 is a fragmentary detailed view of the spring adjustment mechanism of FIG. 6, taken substantially along line 8—8 of FIG. 6.

Referring now more particularly to the drawings, FIG. 1 illustrates an air distribution unit or terminal adapted for being installed in a central air-conditioning system for controlling the flow of conditioned air into an air-conditioned zone or room. The air distribution unit includes a hollow, generally rectangular housing 11 having opposing pairs of side walls and an end wall 12 at the upstream end thereof. Thermal and sound insulation 11a is provided on the walls of housing 11. An air distribution line 13 supplying conditioned air under relatively high pressure and velocity from a central conditioning device communicates with housing 11 through an opening in end wall 12 thereof. Housing 11 also includes a wall 14 near the upstream end thereof in spaced relation from wall 12 and having an opening therein through which the air from air distribution line 13 may flow.

As noted earlier, changing demands for air in the various zones or rooms of an air-conditioned building will cause pressure variations in the air distribution lines with resultant variations in the volume of air flow therethrough. Accordingly, an air volume regulator, generally indicated by the reference character 20, is mounted on wall 14 surrounding the opening therein and is adapted for controlling the flow of air therethrough for maintaining a substantially constant volume flow of air to the room or zone being conditioned.

Referring now more particularly to the construction of the volume regulator 20, the regulator includes a peaked housing having the base or inlet end thereof open and connected to wall 14 for receiving the flow of air therethrough, and having opposed parallel generally rectangular upper and lower side walls 21 and 22 extending downstream from the base or inlet end of the housing for a short distance. Inclined perforated upper and lower side walls 23, 24 extend angularly toward one another from the downstream edge of side walls 21 and 22 to the apex of the peaked housing where they join a downstream wall 25. Volume regulator 20 also includes opposing end walls 26 at opposite ends of the regulator.

Valve means is provided within the housing of the regulator and comprises a curtain 28 of flexible imperforate material which is attached to the inner surface of downstream wall 25 and extends upstream therefrom a sufficient distance to cover the perforated inclined upper side wall 23 of the housing. An identical curtain means 28 is provided on the lower side of the regulator extending upstream for covering the lower perforated inclined side wall 24.

The free ends of each of the pair of curtain means 28 are affixed to a pair of parallel rod means 29 extending transversely of the housing generally parallel to the side walls 21, 22, 23 and 24. The valve means also includes a linkage assembly, generally indicated at 30, which is connected to each of the rod means 29 and is adapted for controlling movement of the curtain means 28 into and out of engagement with inclined perforated side walls 23, 24 for adjustably covering or uncovering the perforations therein to thereby adjust the area of the air passageway through regulator 20.

Linkage assembly 30 includes a pair of oppositely disposed link arms 31 and 32 at opposite ends of the housing, each having one end thereof pivotally connected to downstream wall 25, and having the opposite end thereof connected to an end of one of the rod means 29 for thereby moving the same toward and away from inclined perforated walls 23 and 24. An additional rod means 33 is provided extending transversely of the housing in parallel relation to each rod means 29 and interconnects corresponding link arms 31 or 32 at opposite ends of the housing. A generally U-shaped support bracket 34 has opposite ends thereof mounted on wall 25 and a medial portion thereof extending inwardly and transversely of the housing. Linkage assemblly 30 also includes a reciprocable push rod 35 extending outwardly from within the housing through a hole in downstream wall 25. A coil compression spring 44 is positioned surrounding the outer exposed portion of push rod 35, as will be described in more detail later, and an abutment 35a is provided on the outermost threaded terminal portion of push rod 35 for engaging one end of the coil compression spring 44.

The innermost end of push rod 35 has pivotally connected thereto pairs of oppositely disposed link arms 36, 37, which, in turn, have their free ends pivotally connected to a medial portion of rod means 33. In accordance with this linkage arrangement, the movement of curtain means 28 toward a closed position will cause push rod 35 to be moved axially inwardly into the housing of regulator 20 while compressing the coil compression spring 44.

From the foregoing description, it will be apparent that variations in pressure on the upstream side of regulator 20 will cause movement of the flexible curtain means 28 toward and away from the inclined perforated side walls 23 and 24 to progressively cover and uncover the perforations therein, for thereby maintaining a substantially uniform flow of air through the regulator regardless of the variations in the supply air pressure. Volume regulators having a housing and flexible curtain valve of this general construction and operation are known, and disclosed for example, in the above-noted Werder U.S. Pat. No. 2,890,716.

In order to prevent hunting and fluttering of the curtain means 28 when upstream air pressure periodically varies, linkage 30 also includes a dampening mechanism adapted for resisting any rapid movement of the curtain means 28. This dampening mechanism includes an elongate spiral threaded member 38, connected to the inner end of push rod 35 and extending coaxially therewith, and a flywheel 39 carried by support bracket 34 and cooperating with the threaded member 38 so as to revolve upon axial movement of push rod 35. A dampening mechanism of this type is disclosed in Smith et al U.S. Pat. No. 3,394,769, issued July 20, 1968, to which reference may be made for further details of the structure and operation of this type of mechanism.

Referring to FIGS. 1 and 2, the volume regulator 20 is provided with a spring adjustment mechanism, generally indicated at 40, mounted on the downstream end of the regulator and including a pair of spaced apart generally parallel frame members 41 and 42 mounted on opposite sides of the outwardly extending portion of push rod 35 and the coil compression spring 44 which is positioned surrounding the push rod 35. The frame members 41 and 42 are fastened together in spaced apart relation by means of cooperating fastener members 43 and cylindrical spacer members 43a.

As seen in FIG. 3, the spring adjustment mechanism 40 is mounted for longitudinal sliding movement on the exterior of the regulator housing by means of inturned flanges 41a, 42a provided along the lower edge of each of the frame members 41 and 42. Flanges 41a and 42a cooperate with longitudinally extending notches 45a provided in opposite sides of an elongate mounting member 45 which is secured to the outer surface of downstream wall 25 of the regulator housing. A linkage assembly 46 is provided interconnecting the spring adjustment mechanism 40 with the reciprocable operator of a conventional prime mover 47 (FIG. 1), such as a flexible diaphragm-type pneumatic motor.

Referring more particularly to the frame members 41 and 42 of the spring adjustment mechanism 40, it will be noted that the opposing inner walls thereof are provided with a series of elongate parallel longitudinally extending ridges 50. As illustrated, seven ridges 50 are provided on the inner wall of each of the frame members 41 and 42, with the lowermost ridge 50 of frame member 42 being spaced a slightly greater distance from the inturned flange 42a than the corresponding spacing between flange 41a and the lowermost ridge on frame member 41 to compensate for the pitch of the helical turns of the coil spring 44 so that the ridges 50 will properly engage the turns on opposite sides of the coil spring. It will be understood that a different number of ridges than that shown may be employed on the frame members, depending upon the size of the spring employed.

The elongate ridges of each series are of graduated lengths, but are preferably of substantially equal height as measured inwardly from the walls toward the coil spring, and of substantially equal width and spacing from adjacent ridges. The ridges of each series serve as abutment shoulders for immobilizing the turns of the coil spring when positioned therebetween.

As illustrated, the leading end portions 50a of successive elongate ridges in each series terminate in a staggered laterally offset relation to permit successively positioning the ridges between the turns of the coil spring 44 during longitudinal movement of the spring adjustment assembly 40 relative to the spring. Also, the leading end portions 50a are tapered or pointed to facilitate easy insertion of the ridges 50 between the turns of coil spring 44 during longitudinal movement of the spring adjustment assembly 40. A pair of support posts 48, 49 extend upwardly from mounting member 45 alongside opposite sides of the coil spring 44 and serve to limit lateral movement of the spring during movement of the ridges into or out of engagement with the spring.

The operation of the spring adjustment mechanism 40 is best understood by referring initially to FIG. 3. As illustrated therein, the spring adjustment mechanism 40 is laterally positioned so as to locate all but one of the ridges 50 between successive turns of the coil spring 44 to thereby immobilize those turns of the spring and thereby reduce the effective length of the spring. With the spring adjustment mechanism in this position, the biasing characteristics of the spring are such that the spring will be compressed only a relatively short distance when a predetermined biasing force is exerted thereagainst. Thus, the valve means of the volume regulator is maintained in a relatively widely opened position so as to allow a large volume of air to flow through the regulator.

When it is desired to adjust the regulator to decrease the flow of air therethrough, the spring adjustment mechanism is moved to the left as viewed in FIG. 3 so that a fewer number of the turns of the coil spring are immobilized. When the adjustment mechanism is in the position illustrated in FIG. 5, for example, the spring will be compressed a greater distance by the same predetermined force so as to therefore position the valve means in a more fully closed position and thereby maintain the flow of air through the housing at a lower rate.

It will be appreciated that when the adjustment mechanism is moved so as to cause the curtains to be opened more fully to allow a greater flow of air through the regulator, it is necessary to open the curtains in opposition to a considerable closing bias on the curtains brought about by the force of the air thereagainst. The successive positioning of each ridge 50 of the series between adjacent turns of the spring serves to incrementally open or expand the spring against the closing bias exerted thereon, and in so doing, facilitates the positioning of the next successive ridge 50 between the next successive adjacent turns of the coil spring. This wedging or opening action of each successive ridge 50 facilitates adjustment of the regulator to a more fully opened condition with the application of a relatively low amount of force on the spring adjustment mechanism 40, even though the force of the air within the regulator tending to bias the valve means to a closed position is considerably higher. This permits using a relatively low powered and inexpensive prime mover. Further, the spring adjustment mechanism 40 has a short stroke of travel between one extreme position wherein a maximum member of the turns of the spring are immobilized and the opposite extreme wherein none of the turns of the spring are immobilized. This short distance or stroke of travel, which may be less than about two inches, permits the use of the conventional type of prime mover employed in air-conditioning control systems, such as a pneumatic or electric motor, wherein a reciprocable motion of relatively short stroke is imparted, generally no more than about 1 to 2 inches.

As illustrated in FIG. 1, a pneumatic prime mover 47 is connected to the spring adjustment mechanism 40 for moving the same and thereby varying the biasing characteristics of the spring 44. In the arrangement illustrated, the regulator is adapted for being adjusted automatically in response to varying external conditions and is therefore adapted for use in a variable volume air-conditioning system wherein the flow rate setting of the regulator is varied in accordance with varying demands in the room or zone being conditioned. More particularly, a control or sensing unit 48, located remotely of the regulator, is operatively connected to the pneumatic prime mover 47 through a pneumatic control line 49. Sensing unit 48, for example, may comprise a thermostat located in the room or zone being conditioned and which is responsive to the varying temperature in the room for thereby varying the control air pressure in the pneumatic control line 49 and thereby causing an increased or decreased flow of air through the regulator into the air-conditioned room or zone.

It will appreciated that the volume regulator 20 may also be used in a constant volume system where it is not necessary to automatically vary the volume of the regulator but where is may be desirable to provide means for easily manually adjusting the regulator externally of the housing 11 to a different flow rate. In these instances, the spring adjustment mechanism 40 may be provided with any suitable manual adjustment linkage (not shown) so as to permit conveniently adjusting the regulator from externally of the housing 11.

In certaian installations of the volume regulator in air-conditioning systems, it may be desirable to provide means for, at times, completely shutting off the flow of air through the regulator. This may be easily accomplished with the spring adjustment mechanism of this invention in several ways. For example, the abutment 35a may be adjusted so that when the spring adjustment mechanism 40 is positioned with the ridges 50 thereof out of engagement with the turns of the spring, a small amount of slack or "play" will be present upon inward movement of push rod 35 prior to engagement of the spring 44 by the abutment 35a. Alternatively, a spring of sufficient compressibility may be employed so that when the ridges 50 of the spring adjustment mechanism are moved out of engagement with the spring, the closing bias of the air in the regulator housing will be sufficient to overcome the opposing opening bias of the spring and thereby push the valve to a closed position. By similar means, the air regulator of this invention may be adjusted, if desired, so as to always deliver a predetermined minimum flow of air therethrough even when the spring adjustment mechanism is moved so that the abutment shoulders thereof are completely out of engagement with the spring.

An alternate means for varying the biasing characteristics of the coil compression spring is provided in accordance with the second form of the invention, illustrated in FIGS. 6–8. This embodiment of the invention is quite similar to the first form of the invention illustrated in FIGS. 1–5, and differs thereover only in the mechanism by which the successive turns of the coil spring are immobilized. Accordingly, to avoid repetitive description, only the spring adjustment mechanism is illustrated and described in detail, it being understood that the regulator housing and valve assembly previously described would be employed in this second form of the invention as well, with the spring adjustment mechanism being similarly mounted on the downstream end of the regulator housing. Thus, like reference numerals, with prime notation added, will be employed for those parts of the regulator which have been previously described, with the following description being primarily directed to the details of the spring adjustment mechanism.

Referring to FIG. 6, it will be seen that the spring adjustment mechanism 60 of the second form of the invention comprises an opposing pair of elongate arcuate adjustment members 61 positioned on opposite sides of the coil spring 44', with the lower flanged ends 61a thereof being mounted by suitable fastener means 62 to a mounting plate 63 carried by the downstream wall 25' of the regulator housing. The inner opposing surfaces of the elongate adjustment members 61 have a series of spaced teeth 61b formed thereon adapted for engaging the turns of the coil spring. The teeth are preferably spaced apart a distance corresponding to the spacing of the turns of the spring in its normal relaxed condition and pointed so as to facilitate positioning the teeth 61b between the turns of the spring. The adjustment members 61 are preferably formed of a strong resilient material such as spring steel so as to be adapted for being biased inwardly toward and into engagement with the coil spring 44'.

Like the ridges 50 of the previous embodiment, the teeth 61b on adjustment member 61 serve as abutment shoulders for engaging and immobilizing a desired number of the turns of the coil spring for thereby varying the biasing chacteristics of the spring. As illustrated, the teeth are adapted for being successively positioned between adjacent turns of the spring and thereby facilitate returning the spring to its original uncompressed length with a relatively low amount of force, in the manner previously described, in spite of the relatively larger compressive force applied on the spring by the air pressure in the regulator.

As illustrated, a linkage assembly is provided cooperating with the elongate adjustment members 61 for facilitating positioning the adjustment members so as to engage the desired number of turns of the coil spring 44'. The linkage assembly comprises a pair of parallel rods 64 located in engagement with the back surfaces of the adjustment members 61 and adapted for travel upwardly therealong in parallel elongate slots 65a in guide plates 65 on opposite sides of the spring so as to thereby straighten the arcuate flexible adjustment members 61 and successively position the teeth 61b thereof in engagement with the coil spring 44'. The rods 64 are carried by opposite ends of a generally U-shaped yoke 66, the medial portion of which, in turn, is connected to the reciprocable operator 67 of a conventional prime mover, such as the flexible diaphragm-type pneumatic motor 68 illustrated. Pneumatic motor 68 is supported by a bracket 69 in suitable position overlying the coil spring 44' on the downstream end of the housing of regulator 20'.

As in the previous embodiment, the pneumatic prime mover 67 may be connected to a suitable control or sensing unit, such as a thermostat, located remotely of the regulator which serves to thereby adjust the controlled output of the regulator automatically in response to varying external conditions. Alternatively, the spring adjustment mechanism 60 may be provided with a suitable manual adjustment linkage to permit convenient manual adjustment of the regulator from externally of the duct or housing in which the regulator is mounted. Thus, the regulator is adapted for use either in a variable or constant volume air-conditioning system as desired.

In the drawings and specification there have been set forth preferred embodiments of the invention and although specific terms are employed, they are used in a generic and descriptive sense only and not for purposes of limitation.

That which is claimed is:

1. In an air volume regulator comprising a housing defining a passageway for the flow of air therethrough, valve means mounted for movement in said housing for adjustably restricting the air flow therethrough, and a coil compression spring cooperating with said valve means for exerting an opening bias on the valve means in opposition to a closing bias exerted thereon by the pressure of the air in the housing whereby said valve means is adapted for maintaining the air flow through the housing at a substantially constant rate, the combination therewith of spring adjustment means carried by said housing and positioned alongside of said coil spring and including means normally positioned out of engagement with said coil spring but movable into said spring from opposite sides thereof between a plurality of the turns of the spring for varying the number of working turns in the coil spring so as to thereby adjust the regulator to maintain a different rate of air flow therethrough.

2. In an air volume regulator comprising a housing defining a passageway for the flow of air therethrough, valve means mounted for movement in said housing for adjustably restricting the air flow therethrough, and a coil compression spring cooperating with said valve means for exerting an opening bias on the valve means in opposition to a closing bias exerted thereon by the pressure of the air in the housing whereby said valve means is adapted for maintaining the air flow through the housing at a substantially constant rate, the combination therewith of sensing means for sensing a demand for an increased or decreased flow of air through the regulator, spring adjustment means positioned alongside said coil compression spring and being movable into and between the turns thereof for progressively immobilizing a selected number of the turns upon movement of the spring adjustment means into the spring for thereby varying the number of working turns in the coil spring so as to vary the biasing characteristics of the spring, and motive means operably connected to said sensing means and to said spring adjustment means and operable for effecting movement of the spring adjustment means in response to a sensed demand for an increased or decreased flow of air through the regulator so as to vary the biasing characteristics of the spring and thereby adjust the regulator to maintain a different rate of air flow therethrough.

3. In an air volume regulator comprising a housing defining a passageway for the flow of air therethrough, valve means mounted for movement in said housing for adjustably restricting the air flow therethrough, and a coil compression spring cooperating with said valve means for exerting an opening bias on the valve means in opposition to a closing bias exerted thereon by the pressure of the air in the housing whereby said valve means is adapted for maintaining the air flow through the housing at a substantially constant rate, the combination therewith of means for adjusting the regulator to maintain a different flow rate and comprising means defining a plurality of spaced abutment shoulders normally positioned alongside of said coil spring, and means cooperating with said plurality of abutment shoulders for successively positioning the abutment shoulders between the turns of said spring for immobilizing a selected number of the turns of the spring and thereby varying the biasing characteristics of the spring.

4. In an air volume regulator according to claim 3, wherein said means defining said plurality of abutment shoulders comprises two opposing series of abutment shoulders positioned on opposite sides of said coil spring and being adapted for movement into the spring from opposite sides thereof.

5. In an air volume regulator according to claim 4, wherein the abutment shoulders in each of said series are spaced apart a distance corresponding to the spacing of the turns of the coil spring in its unbiased condition to facilitate movement of the abutment shoulders into the spring.

6. In an air volume regulator according to claim 3, wherein said means for successively positioning the abutment shoulders between the turns of said spring comprises reciprocable motive means cooperating with said plurality of spaced abutment shoulders and responsive to a demand for an increased or decreased flow of air through the regulator for moving the abutment shoulders successively into or out of engagement with the spring and thereby varying the biasing characteristics of the spring.

7. In an air volume regulator according to claim 3, wherein said means defining said plurality of abutment shoulders comprises a pair of parallel walls carried by said housing and positioned closely adjacent opposite sides of said coil spring, opposing inner surfaces of said walls having a series of elongate parallel ridges thereon extending generally perpendicular to the axis of said coil spring and defining said plurality of abutment shoulders, the leading end portions of successive elongate ridges in each series terminating in staggered laterally offset, relation, and means mounting said pair of walls for sliding movement with respect to said coil spring along a direction parallel to said elongate ridges so as to position the leading end portion of an increasing number of said ridges between successive turns of said spring for thereby immobilizing the same and varying the biasing characteristics of the spring.

8. In an air volume regulator according to claim 3, wherein said means defining said plurality of abutment shoulders comprises an opposing pair of elongate members positioned on opposite sides of said coil spring in spaced relation therefrom, inner opposing surfaces of said elongate members adjacent said coil spring having a series of spaced teeth thereon defining said plurality of abutment shoulders, and means cooperating with said opposing pair of elongate members for moving the same toward said spring so as to position increasing numbers of said teeth between successive turns of said spring for thereby immobilizing the same and varying the biasing characteristics of the spring.

9. In an air volume regulator comprising a housing defining a passageway for the flow of air therethrough, valve means mounted for movement in said housing for adjustably restricting the air flow therethrough, and a coil compression spring cooperating with said valve means for exerting an opening bias on the valve means in opposition to a closing bias exerted thereon by the pressure of the air in the housing whereby said valve means is adapted for maintaining the air flow through the housing at a substantially constant rate, the combination therewith of means for adjusting the regulator to maintain a different flow rate and comprising means defining two opposing series of spaced abutment shoulders normally positioned adjacent opposite sides of said coil spring, and means cooperating with said two series of abutment shoulders for successively positioning the abutment shoulders of each series into opposite sides of said coil spring between the turns thereof beginning adjacent one end of the spring and progressively along the length thereof toward the opposite end of the spring, said abutment shoulders being thereby adapted to immobilize a selected number of the turns of the spring so as to vary the biasing characteristics of the spring.

* * * * *